United States Patent
Mastro

(10) Patent No.: US 11,441,450 B2
(45) Date of Patent: Sep. 13, 2022

(54) DUAL DIRECTION WINDMILL PUMP FOR GEARED TURBOFAN ENGINES

(71) Applicant: UNITED TECHNOLOGIES CORPORATION, Farmington, CT (US)

(72) Inventor: Jacob Peter Mastro, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1027 days.

(21) Appl. No.: 16/001,699

(22) Filed: Jun. 6, 2018

(65) Prior Publication Data

US 2019/0376416 A1    Dec. 12, 2019

(51) Int. Cl.
| | | |
|---|---|---|
| F01D 25/20 | (2006.01) | |
| F01D 15/08 | (2006.01) | |
| F01D 15/12 | (2006.01) | |
| F02C 7/06 | (2006.01) | |
| F02C 7/32 | (2006.01) | |

(52) U.S. Cl.
CPC .............. *F01D 25/20* (2013.01); *F01D 15/08* (2013.01); *F01D 15/12* (2013.01); *F02C 7/06* (2013.01); *F02C 7/32* (2013.01); *F05D 2260/40311* (2013.01); *F05D 2260/98* (2013.01)

(58) Field of Classification Search
CPC .... F02C 7/06; F02C 7/32; F01D 15/08; F01D 15/12; F01D 25/18; F01D 25/20; F16H 2003/0822; F16H 2037/044; F05D 2260/98
See application file for complete search history.

(56) References Cited

U.S. PATENT DOCUMENTS

| | | | | |
|---|---|---|---|---|
| 5,349,814 A | * | 9/1994 | Ciokajlo | F02C 7/262 60/226.1 |
| 2016/0097328 A1 | * | 4/2016 | Wintgens | F02C 7/32 415/1 |
| 2016/0222975 A1 | * | 8/2016 | Sheridan | F01D 25/20 |
| 2017/0145920 A1 | * | 5/2017 | Schwarz | F02C 7/06 |
| 2017/0211477 A1 | | 7/2017 | Menheere et al. | |

FOREIGN PATENT DOCUMENTS

| | | |
|---|---|---|
| EP | 3171055 | 5/2017 |
| EP | 3543483 | 9/2019 |
| WO | 2015060912 | 4/2015 |

OTHER PUBLICATIONS

European Patent Office, European Search Report dated Oct. 14, 2019 in Application No. 19178502.1.
European Patent Office, European Office Action dated Jun. 14, 2021 in Application No. 19178502.1.

* cited by examiner

*Primary Examiner* — Jason H Duger
(74) *Attorney, Agent, or Firm* — Snell & Wilmer L.L.P.

(57) ABSTRACT

A lubrication system may comprise a shaft including a shaft gear, a pump configured to supply a flow of lubricant to a component benefiting from lubrication and an input gear train coupled to the shaft gear and configured to drive the gear pump with a unidirectional rotation in response to a forward rotation and an reverse rotation of the shaft gear. The input gear grain may comprise a primary gear coupled to a common shaft. The input gear train may further comprise a forward shaft and a forward gear about the common shaft, wherein the forward gear is coupled to the forward shaft.

14 Claims, 7 Drawing Sheets

DUAL DIRECTION WINDMILL PUMP FOR GEARED TURBOFAN ENGINES

FIELD

The disclosure relates generally to lubrication systems for journal bearings and geared architectures.

BACKGROUND

Gas turbine engines may comprise a turbine section and a fan section. A fan section may be driven by a geared architecture such as, for example, epicyclical gear assemblies and the like. An epicyclical gear assembly may be a speed reduction device and thereby tend to allow a fan of the fan section to be driven at a different speed than a turbine of the turbine section. In such architectures, a shaft driven by the turbine provides an input to the epicyclical gear assembly which, in turn drives the fan at a reduced speed such that both the turbine and the fan tend to rotate at closer to a more optimal speed.

SUMMARY

In various embodiments the present disclosure provides a lubrication comprising a shaft including a shaft gear, a pump configured to supply a flow of lubricant to a component benefiting from lubrication and an input gear train coupled to the shaft gear and configured to drive the pump with a unidirectional rotation in response to a forward rotation and an reverse rotation of the shaft gear.

In various embodiments, the input gear train may comprise a primary gear coupled to a common shaft. In various embodiments, the input gear train may further comprise a forward shaft and a forward gear about the common shaft, wherein the forward gear is coupled to the forward shaft. In various embodiments, the input gear train further comprises a reverse shaft and a reverse gear about the common shaft, wherein the reverse gear is coupled to the reverse shaft. In various embodiments, the input gear train further comprises a forward clutch coupled to the forward shaft and a reverse clutch coupled to the reverse shaft. In various embodiments, the forward clutch and the reverse clutch are selectively coupled to the common shaft, wherein the forward clutch is configured to lock in response to rotating the common shaft in a first direction, wherein the reverse clutch is configured to lock in response to rotating the common shaft in a second direction. In various embodiments, the input gear train further comprises an idler gear supported by an idler shaft and coupled to the reverse gear. In various embodiments, the input gear train further comprises a pump gear coupled to the forward gear and the idler gear, the pump gear supported by a pump shaft coupled to the pump.

In various embodiments, the present disclosure provides a gas turbine engine comprising a compressor section configured to compress a gas, a combustor section aft of the compressor section configured to combust the gas, a turbine section aft of the combustor section configured to extract work from the combusted gas, and a lubrication system comprising a shaft including a shaft gear, a pump configured to supply a flow of lubricant to a component benefiting from lubrication, and an input gear train coupled to the shaft gear and configured to drive the pump with a unidirectional rotation in response to a forward rotation and an reverse rotation of the shaft gear.

In various embodiments, the input gear train may comprise a primary gear coupled to a common shaft. In various embodiments, the input gear train may further comprise a forward shaft and a forward gear about the common shaft, wherein the forward gear is coupled to the forward shaft. In various embodiments, the input gear train further comprises a reverse shaft and a reverse gear about the common shaft, wherein the reverse gear is coupled to the reverse shaft. In various embodiments, the input gear train further comprises a forward clutch coupled to the forward shaft and a reverse clutch coupled to the reverse shaft. In various embodiments, the forward clutch and the reverse clutch are selectively coupled to the common shaft, wherein the forward clutch is configured to lock in response to rotating the common shaft in a first direction, wherein the reverse clutch is configured to lock in response to rotating the common shaft in a second direction. In various embodiments, the input gear train further comprises an idler gear supported by an idler shaft and coupled to the reverse gear. In various embodiments, the input gear train further comprises a pump gear coupled to the forward gear and the idler gear, the pump gear supported by a pump shaft coupled to the pump. In various embodiments, the shaft is in communication with a fan, wherein the shaft rotates in a reverse direction in response to a windmilling of the fan, wherein the component comprises a geared architecture including at least one journal bearing.

In various embodiments, the present disclosure provides a method of lubricating a geared architecture comprising rotating a shaft gear in a forward direction and rotating a primary gear and common shaft in a first direction, locking a forward clutch in response to the rotating in the first direction and rotating a forward gear in the first direction, and generating a flow of lubricant in response to rotating the forward gear in the first direction. The method may include rotating the shaft gear in a reverse direction and rotating the primary gear and the common shaft in a second direction, unlocking the forward clutch and locking a reverse clutch in response to the rotating in the second direction and rotating a reverse gear in the second direction, and generating the flow of lubricant in response to rotating the reverse gear in the second direction. The method may further include idling at least one of the forward gear or the reverse gear in response to rotating the common shaft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements. Accordingly, elements with like element numbering may be shown in the figures, but may not be necessarily be repeated herein for the sake of clarity.

DETAILED DESCRIPTION

The detailed description of exemplary embodiments herein, and with reference to the accompanying drawings, together describe the exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

As used herein, "distal" refers to the direction outward, or generally, away from a reference component. As used herein, "proximate" refers to a direction inward, or generally, towards a reference component. A first component that is "radially outward" or "outboard" of a second component means that the first component is positioned at a greater distance away from a central longitudinal axis of the gas turbine engine. A first component that is "radially inward" or "inboard" of a second component means that the first component is positioned closer to the engine central longitudinal axis than the second component. The terminology "radially outward" and "radially inward" may also be used relative to references other than the engine central longitudinal axis.

Figure 1:
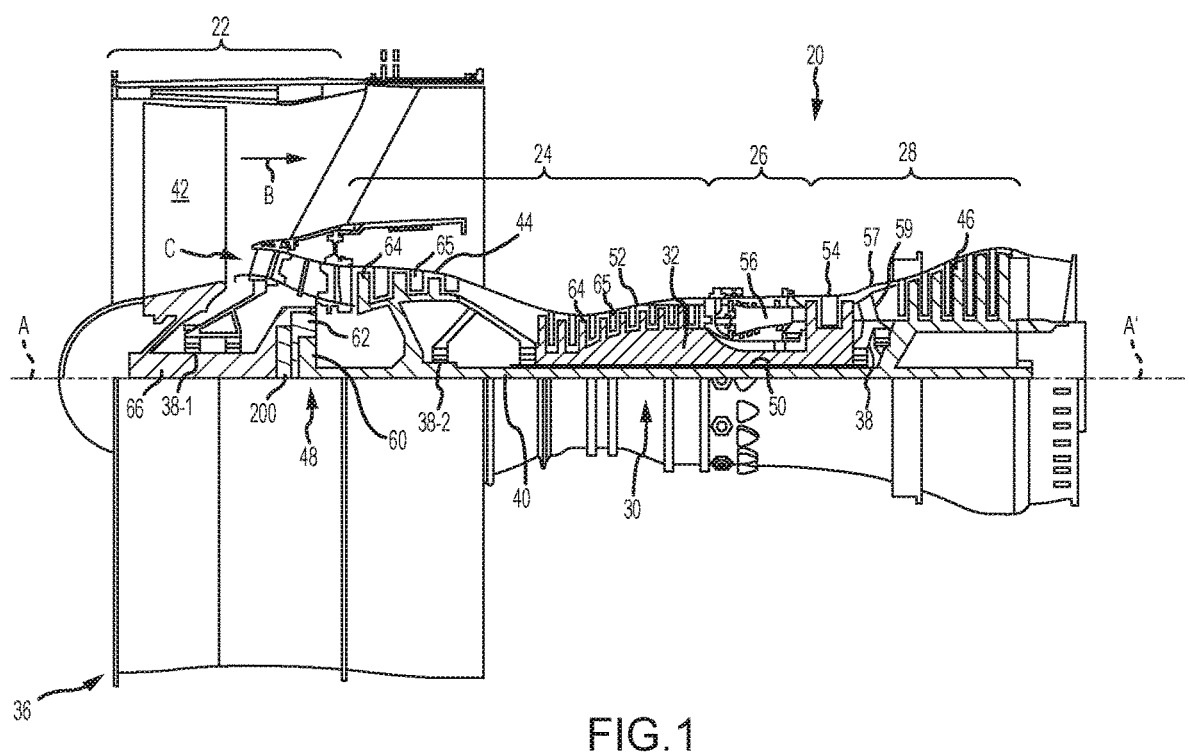
FIG. 1 illustrates a schematic cross-section of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor 44) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure which may comprise a fan shaft 66. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 and LPC 44 may comprise alternating rows of rotating rotors 64 and stationary stators 65. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with combined reference to FIGS. 2A, 2B, 3A, and 3B, fan section 22 may further comprise a lubrication system 200 driven by an input gear train 300. Input gear train 300 is driven by shaft gear 302 and includes primary gear train 206 and reverse gear train 208. In various embodiments, shaft gear 302 is disposed about fan shaft 66 which is driven by geared architecture 48 during normal engine operating conditions. During normal engine operating conditions, low pressure turbine 46 drives inner shaft 40 and, in turn, gear assembly 60 rotates fan shaft 66 and shaft gear 302 in a forward direction 304. Rotating fan shaft 66 in the forward direction 304 thereby drives fan 42 forward tending to produce thrust. Lubrication system 200 includes input gear train 300 and comprises a gear pump 202 which sends flow of a lubricant (e.g, via a conduit 204 or other suitable lubricant channel) to geared architecture 48 tending thereby to prolong the operational life of geared architecture 48. In shaft gear 302 rotating in the forward direction 304, gear pump 202 is driven by primary gear train 206 (stippled components shown in FIG. 2A). When gas turbine engine 20 is in a non-operating condition, airflow over fan 42 may tend to rotate fan 42 (i.e. a phenomenon known as windmilling) and in response drive fan shaft 66 and thereby shaft gear 302 in a reverse direction 305. In response to the windmilling fan, reverse gear train 208 (stippled components shown in FIG. 2B) drives gear pump 202 and, in this regard, lubrication system 200 may supply lubricant to geared architecture 48 irrespective of a rotational direction of fan 44. In various embodiments, a pump, such as gear pump 202, may comprise any suitable rotary pump such as, for example, a vane pump, a screw pump, a centrifugal pump, g-rotor pump, and/or the like.

Figure 2A:
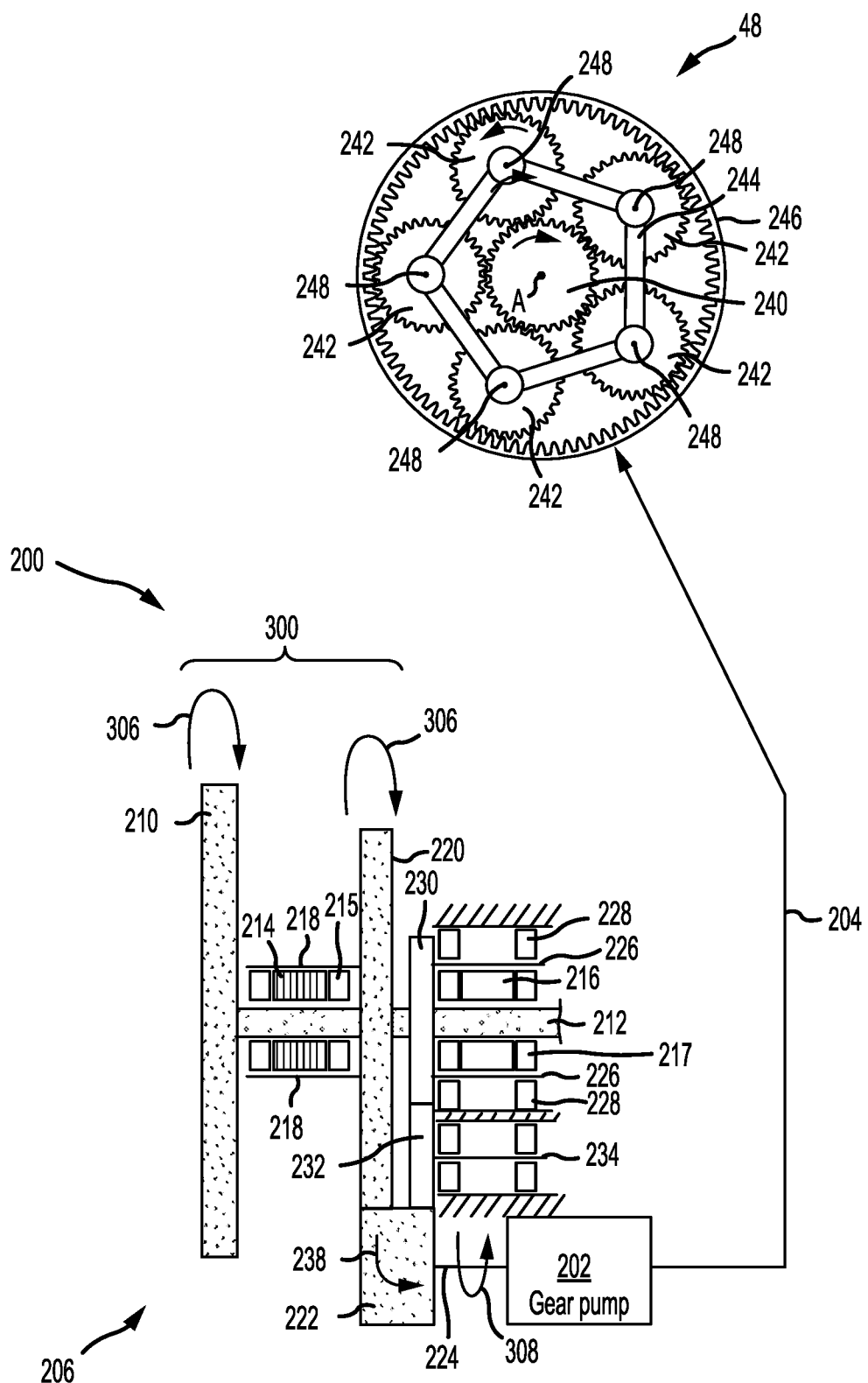
FIG. 2A illustrates a schematic view of a lubrication system, in accordance with various embodiments.
Figure 3A:
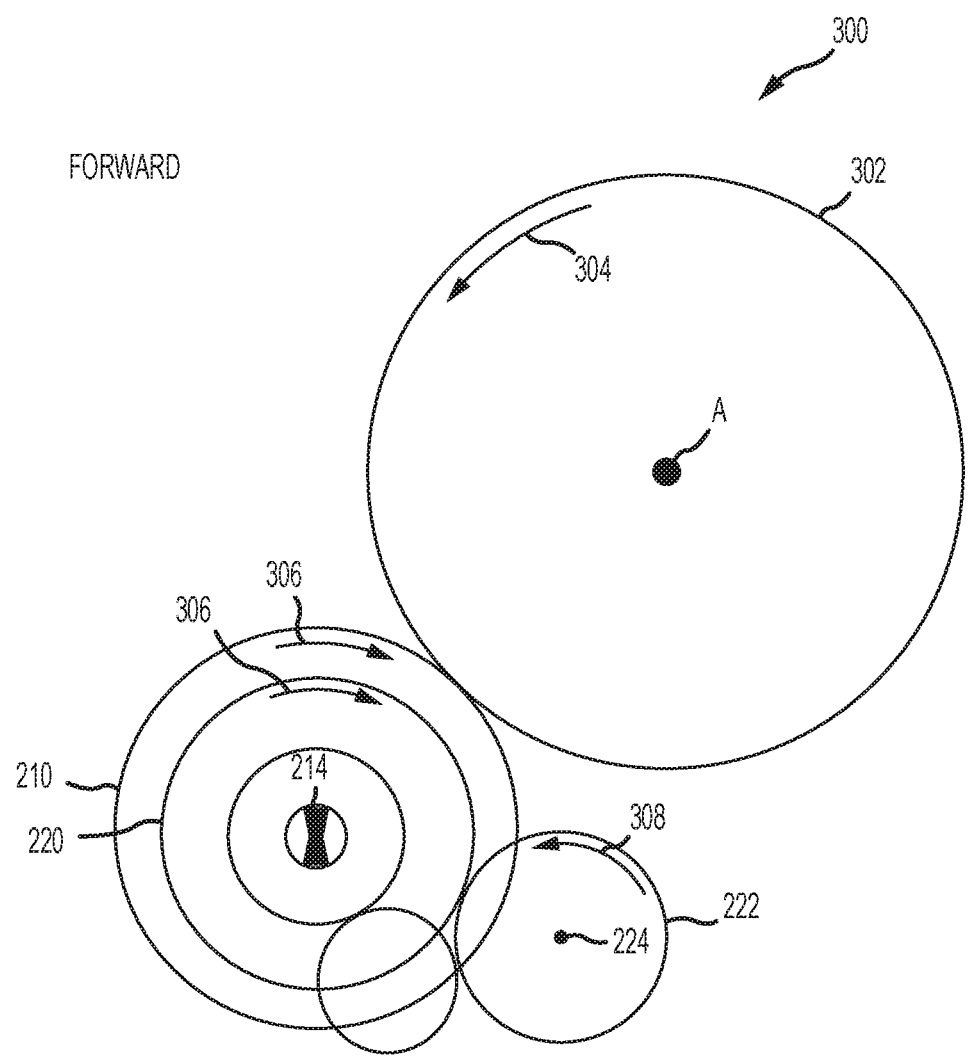
FIG. 3A illustrates a schematic view of an input gear train for a lubrication system, in accordance with various embodiments.

In various embodiments and as shown in FIGS. 2A and 3A, input gear train 300 includes the primary gear train 206 having a primary gear 210 which is coupled to common shaft 212. Common shaft 212 is supported by bearing assembly 217 and coupled to forward clutch 214 (i.e., a first clutch) and reverse clutch 216 (i.e., a second clutch). Forward clutch 214 is coupled to forward shaft 218 which is supported by bearing assembly 215 and lies radially outward of common shaft 212, in turn, common shaft 212 supports bearing assembly 215. Forward shaft 218 supports forward gear 220 which is disposed about common shaft 212 and is selectively coupled thereto by forward clutch 214 such that forward gear 220 will rotate with common shaft 212 only in one desired direction. Forward gear 220 is coupled to pump gear 222 which, in turn, is supported on pump shaft 224 which drives gear pump 202. In normal operation, rotation of the shaft gear 302 in the forward direction 304 results in rotation of the primary gear 210 and common shaft 212 in a first direction 306 which tends to engage forward clutch 214 (as illustrated by vertical stripes). Engaging forward clutch 214 locks forward shaft 218 to common shaft 212 thereby transmitting rotation of the common shaft 212 to the forward gear 220 and causing forward gear 220 to rotate in the first direction 306. Forward gear 220 transmits torque 238 from common shaft 212 to pump gear 222 thereby inducing drive rotation 308 (i.e., a unidirectional rotation) of pump gear 222 and pump shaft 224 tending thereby to supply lubricant from gear pump 202 to geared architecture 48. In various embodiments, gear pump 202 may be configured to supply lubricant in response to a unidirectional rotation of pump shaft 224 and drive rotation 308 may therefore be a unidirectional rotation. Stated another way, gear pump 202 may not supply lubricant in response to a rotation of pump shaft 224 in a direction opposite drive rotation 308 and may tend to be damaged by such a rotation.

In various embodiments, geared architecture 48 includes a sun gear 240 which is circumscribed by a plurality of intermediate gears 242 supported by a carrier 244 and engaged with a surrounding ring gear 246. In various embodiments, each of the intermediate gears 242 may be supported by a journal bearing 248 coupled to carrier 244. In various embodiments, each of the journal bearings 248 tend to benefit from a constant flow of lubricant tending thereby to inhibit wear. It is therefore desirable to ensure a flow of lubricant during operation and during windmilling. It should be understood that, although a geared architecture for driving a fan is disclosed, lubrication system 200 may supply lubricant to any component benefiting from lubrication during windmilling or normal operation of a gas turbine engine.

Figure 2B:
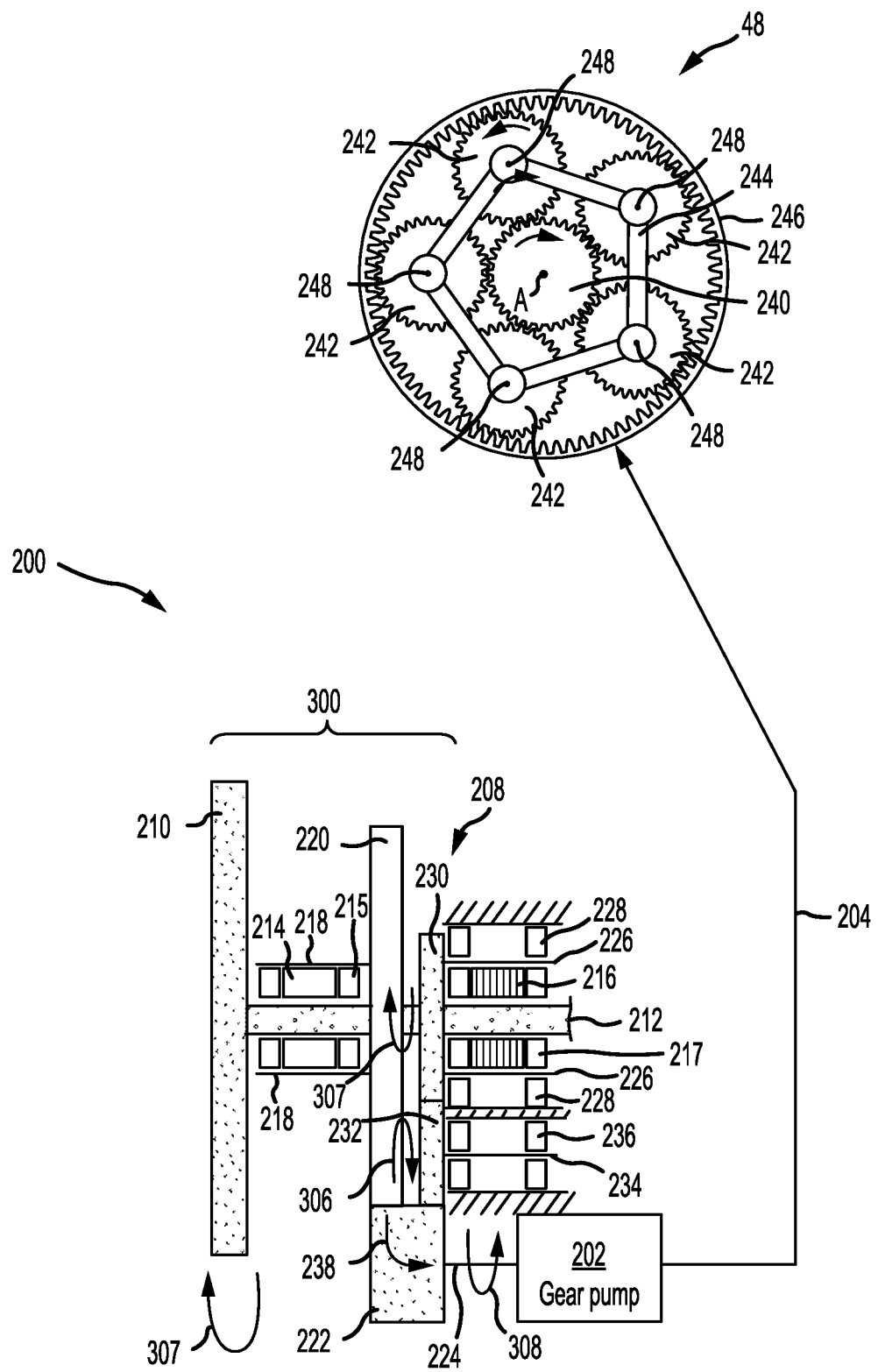
FIG. 2B illustrates a schematic view of a lubrication system, in accordance with various embodiments.
Figure 3B:
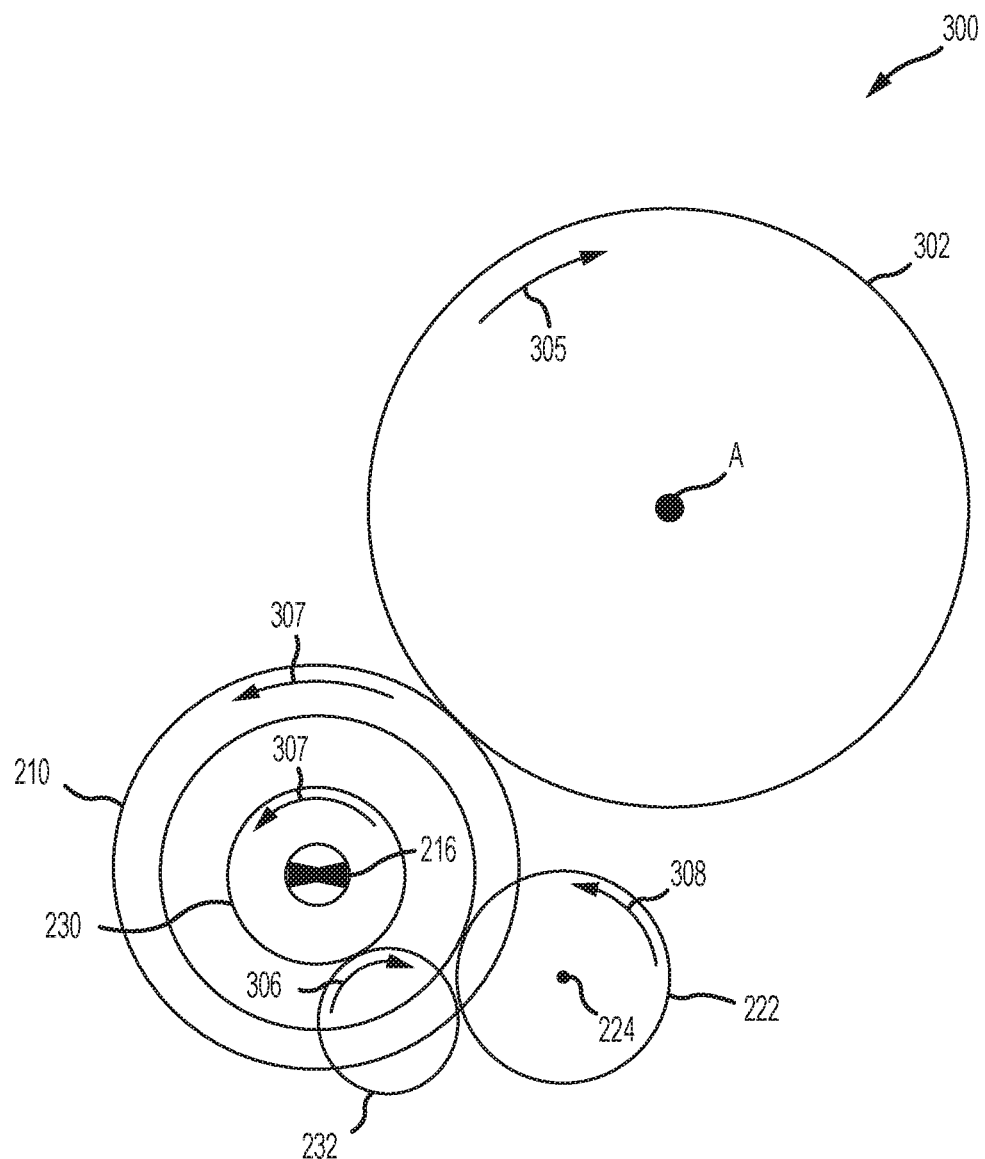
FIG. 3B illustrates a schematic view of an input gear train for a lubrication system, in accordance with various embodiments.

In various embodiments and as shown in FIGS. 2B and 3B, input gear train 300 includes the reverse gear train 208 having the primary gear 210, common shaft 212, forward clutch 214, and reverse clutch 216. Reverse gear train 208 includes a reverse shaft 226 radially outward of common shaft 212 coupled to reverse clutch 216 and supported by bearing assembly 217. Reverse shaft 226 is further supported by reverse shaft bearing assembly 228 about the reverse shaft. Reverse shaft 226 supports a reverse gear 230 which is disposed about common shaft 212 and selectively coupled thereto by reverse clutch 216 such that it will rotate with common shaft 212 only in one desired direction. Reverse gear 230 is coupled to idler gear 232 which is supported by idler shaft 234 and idler bearing 236. Idler gear 232 is coupled to pump gear 222. In windmilling operation, rotation of shaft gear 302 in the reverse direction 305 results in rotation of the primary gear 210 and common shaft 212 in a second direction 307 leaving forward clutch 214 unlocked and forward gear 220 idle. In response to rotation of common shaft and primary gear 210 in the second direction, reverse clutch 216 is engaged (as illustrated by vertical stripes) locking reverse shaft 226 to common shaft 212 thereby transmitting rotation of the common shaft 212 to the reverse gear 230 and causing the reverse gear 230 to rotate in the second direction 307. In response to reverse gear 230 rotating in the second direction 307 idler gear is caused to rotate in the first direction 306 and transmit torque 238 from common shaft 212 to pump gear 222 thereby inducing drive rotation 308 of pump gear 222 and pump shaft 224 tending thereby to supply lubricant from gear pump 202 to geared architecture 48.

As may be appreciated, all the gears of input gear train 300 may be engaged with each other and will turn in all instances where primary gear 210 is driving rotation of common shaft 212. However, forward gear 220 and reverse gear 230 are each selectively coupled to common shaft 212 by a corresponding clutch (forward clutch 214 and reverse clutch 216) at their corresponding shaft (forward shaft 218 and reverse shaft 226). Accordingly, only rotation of common shaft 212 in the desired direction will be transmitted to the respective gear and shaft set which otherwise will idle over the common shaft and not transmit torque from common shaft 212. In this regard, torque may be supplied to induce drive rotation 308 for gear pump 202 irrespective of a rotational direction of common shaft 212.

Figure 4:
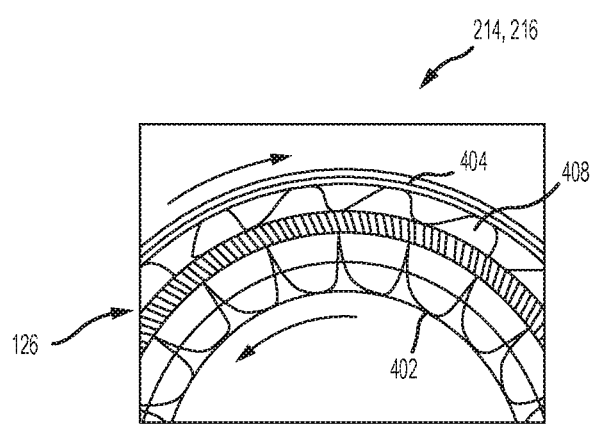
FIG. 4 illustrates a schematic view of an example sprag clutch assembly, in accordance with various embodiments.

In various embodiments and with additional reference to FIG. 4 forward clutch 214 and reverse clutch 216 may be an overrunning clutch design using a sprag configuration which may comprise an inner race 402 and an outer race 404 separated by an annular space 406. Within annular space 406 are a plurality of sprags 408 each of which may be shaped such that the transmit power between the inner race 402 and the outer race 404 when rotating in one direction and allow independent rotation between the two races 402, 404 when rotated in an opposite direction. Accordingly, the sprag clutch design provides for the selective coupling between the inner race 402 and the outer race 404 which may be utilized to transmit torque in one desired direction. It should be appreciated that although a sprag clutch is disclosed other clutch configurations may be used and are within the contemplation of this disclosure.

Figure 5:
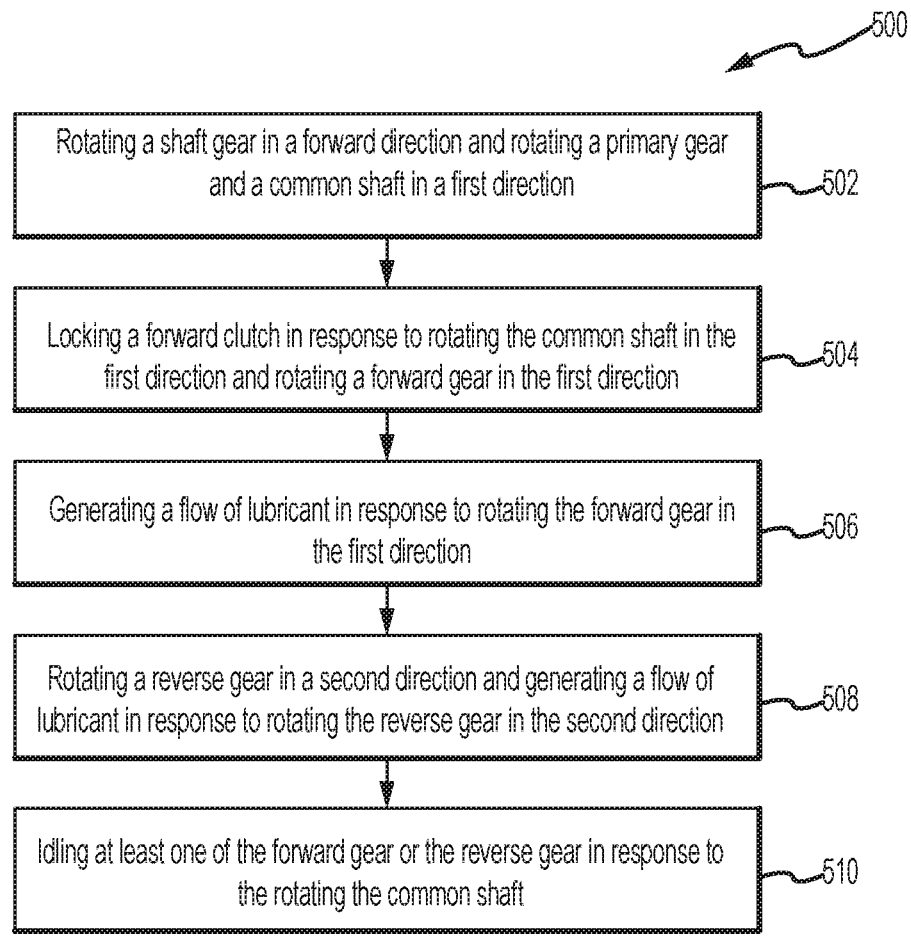
FIG. 5 illustrates a method of lubricating a geared architecture, in accordance with various embodiments.

In various embodiments and with reference to FIG. 5, a method 500 of lubricating a geared architecture such as geared architecture 48 may comprise rotating a shaft gear in a forward direction and rotating a primary gear and common shaft in a first direction (step 502), locking a forward clutch in response to the rotating in the first direction and rotating a forward gear in the first direction (step 504), and generating a flow of lubricant in response to rotating the forward gear in the first direction (step 506). Method 500 may include rotating the shaft gear in a reverse direction and rotating the primary gear and the common shaft in a second direction, locking a reverse clutch in response to the rotating in the second direction and rotating a reverse gear in the second direction, and generating the flow of lubricant in response to rotating the reverse gear in the second direction (step 508). Method 500 may further include idling at least one of the forward gear or the reverse gear in response to rotating the common shaft (step 510).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lubrication system comprising;
a fan shaft including a fan shaft gear;
a pump configured to supply a flow of lubricant to a component benefiting from lubrication; and
an input gear train coupled to the fan shaft gear and configured to drive the pump with a unidirectional rotation in response to a forward rotation and a reverse rotation of the fan shaft gear,
wherein the input gear train further comprises:
a common shaft;
a primary gear fixed to the common shaft;
a forward shaft;
a forward gear fixed to the forward shaft;
a reverse shaft; and
a single reverse gear fixed to the reverse shaft,
wherein each of the forward shaft, the reverse shaft, the forward gear, and the reverse gear, are concentric about the common shaft.

2. The lubrication system of claim 1, wherein the input gear train further comprises a forward clutch fixed to the forward shaft and a reverse clutch fixed to the reverse shaft.

3. The lubrication system of claim 2, wherein the forward clutch and the reverse clutch are selectively coupled to the common shaft, wherein the forward clutch is configured to lock in response to rotating the common shaft in a first direction, wherein the reverse clutch is configured to lock in response to rotating the common shaft in a second direction opposite the first direction.

4. The lubrication system of claim 3, wherein the input gear train further comprises an idler gear supported by an idler shaft and coupled to the reverse gear.

5. The lubrication system of claim 4, wherein the input gear train further comprises a pump gear coupled to the forward gear and the idler gear, the pump gear supported by a pump shaft coupled to the pump.

6. A gas turbine engine comprising:
a compressor section configured to compress a gas;
a combustor section aft of the compressor section configured to combust the gas;
a turbine section aft of the combustor section configured to extract work from the combusted gas; and
a lubrication system comprising:
a fan shaft including a fan shaft gear;
a pump configured to supply a flow of lubricant to a component benefiting from lubrication; and
an input gear train coupled to the fan shaft gear and configured to drive the pump with a unidirectional rotation in response to a forward rotation and a reverse rotation of the fan shaft gear, wherein the input gear train further comprises:

a common shaft;

a primary gear fixed to the common shaft;

a forward shaft;

a forward gear fixed to the forward shaft;

a reverse shaft; and a single reverse gear fixed to the reverse shaft, wherein each of the forward shaft, the reverse shaft, the forward gear, and the reverse gear, are concentric about the common shaft.

7. The gas turbine engine of claim 6, wherein the input gear train further comprises a forward clutch fixed to the forward shaft and a reverse clutch fixed to the reverse shaft.

8. The gas turbine engine of claim 7, wherein the forward clutch and the reverse clutch are selectively coupled to the common shaft, wherein the forward clutch is configured to lock in response to rotating the common shaft in a first direction, wherein the reverse clutch is configured to lock in response to rotating the common shaft in a second direction opposite the first direction.

9. The gas turbine engine of claim 8, wherein the input gear train further comprises an idler gear supported by an idler shaft and coupled to the reverse gear.

10. The gas turbine engine of claim 9, wherein the input gear train further comprises a pump gear coupled to the forward gear and the idler gear, the pump gear supported by a pump shaft coupled to the pump.

11. The gas turbine engine of claim 6, wherein the fan shaft is in communication with a fan, wherein the fan shaft rotates in a reverse direction in response to a windmilling of the fan, wherein the component comprises a geared architecture including at least one journal bearing.

12. A method of operating the lubrication system of claim 1, wherein the component is a geared architecture, the method comprising:

rotating the fan shaft gear in a forward direction and rotating the primary gear and the common shaft in a first direction;

locking a forward clutch;

rotating the forward gear in the first direction; and supplying the flow of lubricant to the geared architecture in response to the rotating of the forward gear in the first direction.

13. The method of claim 12, further comprising rotating the fan shaft gear in a reverse direction and rotating the primary gear and the common shaft in a second direction;

unlocking the forward clutch and locking a reverse clutch;

rotating the reverse gear in the second direction; and generating the flow of lubricant in response to rotating the reverse gear in the second direction.

14. The method of claim 13, including idling the forward gear in response to the unlocking of the forward clutch.

* * * * *